(12) United States Patent
Onitsuka et al.

(10) Patent No.: US 11,879,631 B2
(45) Date of Patent: *Jan. 23, 2024

(54) LIGHT EMITTING DEVICE AND GAME MACHINE

(71) Applicant: OMRON CORPORATION, Kyoto (JP)

(72) Inventors: Hiroyuki Onitsuka, Kyoto (JP); Takahiro Ono, Kyoto (JP); Junya Fujita, Kyoto (JP); Jun Kishimoto, Kyoto (JP); Takehiro Agata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 32 days.

This patent is subject to a terminal disclaimer.

(21) Appl. No.: 17/628,587

(22) PCT Filed: Mar. 9, 2020

(86) PCT No.: PCT/JP2020/009928
§ 371 (c)(1),
(2) Date: Jan. 20, 2022

(87) PCT Pub. No.: WO2021/059558
PCT Pub. Date: Apr. 1, 2021

(65) Prior Publication Data
US 2022/0252250 A1    Aug. 11, 2022

(30) Foreign Application Priority Data

Sep. 26, 2019   (JP) .................................. 2019-175949

(51) Int. Cl.
*F21V 33/00*    (2006.01)
*F21V 7/09*    (2006.01)
(Continued)

(52) U.S. Cl.
CPC .............. *F21V 33/008* (2013.01); *F21V 7/09* (2013.01); *G02B 6/0016* (2013.01);
(Continued)

(58) Field of Classification Search
CPC ...... F21V 33/008; F21V 7/09; F21V 2200/20; G02B 6/0016; G02B 6/0078; F21Y 2115/10
See application file for complete search history.

(56) References Cited

U.S. PATENT DOCUMENTS

| | | |
|---|---|---|
| 2009/0290093 A1 | 11/2009 | Shimura et al. |
| 2014/0078772 A1* | 3/2014 | Gaydoul ............... F21S 43/245 362/555 |
| 2015/0235508 A1 | 8/2015 | Shinohara et al. |
| 2019/0086053 A1* | 3/2019 | Asakawa ................. B60Q 3/74 |
| 2020/0014071 A1 | 1/2020 | Nakashima et al. |
| 2020/0033525 A1 | 1/2020 | Sugiyama et al. |

FOREIGN PATENT DOCUMENTS

| | | |
|---|---|---|
| JP | 2010-102906 A | 5/2010 |
| JP | 2012-252906 A | 12/2012 |

(Continued)

OTHER PUBLICATIONS

English translation of the International Search Report of PCT/JP2020/009928 dated Apr. 14, 2020.
(Continued)

*Primary Examiner* — Thomas M Sember
(74) *Attorney, Agent, or Firm* — METROLEX IP LAW GROUP, PLLC

(57) ABSTRACT

A right side portion, which is a light emitting device, comprises a side light guide plate and a front light guide plate as a plurality of light guide plates in which light is reflected by a prism and emitted from a light emitting surface. The side light guide plate and the front light guide plate are disposed in a row in a state in which the angles of the light emitting surfaces differ between adjacent light guide plates and the ends of adjacent light guide plates are
(Continued)

butted against each other. An LED board is disposed at the end of the side light guide plate, and the end surface of one of the ends of the side light guide plate and the front light guide plate that are abutted against each other is formed as an inclined surface with a reflection function that changes the angle at which the light is guided and causes the light to be incident on the adjacent light guide plate.

6 Claims, 14 Drawing Sheets

(51) Int. Cl.
    *F21V 8/00*       (2006.01)
    *F21Y 115/10*     (2016.01)

(52) U.S. Cl.
    CPC ........ *G02B 6/0078* (2013.01); *F21V 2200/20* (2015.01); *F21Y 2115/10* (2016.08)

(56) References Cited

FOREIGN PATENT DOCUMENTS

| JP | 2015-156317 A | 8/2015 |
|---|---|---|
| WO | 2018181853 A1 | 10/2018 |
| WO | 2018186442 A1 | 10/2018 |

OTHER PUBLICATIONS

English translation of the Written Opinion of PCT/JP2020/009928 dated Apr. 14, 2020.
English translation of the International Search Report of a related international application PCT/JP2020/009977 dated May 19, 2020.
English translation of the Written Opinion of a related international application PCT/JP2020/009977 dated May 19, 2020.

* cited by examiner

LIGHT EMITTING DEVICE AND GAME MACHINE

TECHNICAL FIELD

The present invention relates to a light emitting device comprising light guide plates, and a game machine.

BACKGROUND ART

Conventionally, there is known a technique in which light emitted from a light source unit is made to be incident on an end surface of a light guide plate, the light is reflected by a prism provided on the back surface of the light guide plate, and is emitted from the front surface of the light guide plate. A light emitting device featuring such a technique is installed in a game machine such as a slot machine located in a casino or the like. The applicant of the present application has also proposed in Patent Literature 1 a light emitting device that is favorably installed in a game machine.

Also, the present applicant has developed a light emitting device 100 comprising an elongated light guide plate as shown in FIG. 14. This light emitting device 100 is disposed on both sides of the front surface of a game machine, and emits light toward the front surface of the game machine, for example. FIG. 14 is an external view of this conventional light emitting device 100 installed on the right side of the game machine (the right side when facing the machine).

Here, the internal structure of the light emitting device 100 will be described with reference to FIG. 15. FIG. 15 is a cross-sectional view of the conventional light emitting device 100 that is cut in the lateral direction. As shown in FIG. 15, the light emitting device 100 comprises a light guide plate 101, a case 102, a cover 103, and an LED board 104. All of these members are formed in an elongated shape. The case 102 is disposed on the back surface side of the light guide plate 101 and supports the light guide plate 101. The LED board 104 has a plurality of LEDs 105 mounted in a row running along the lengthwise direction. The LEDs 105 are arranged so as to be opposite the end surface along the lengthwise direction of the light guide plate 101. The cover 103 is made of a transparent material and is disposed so as to cover the case 102, the light guide plate 101, and the LED board 104. A part of the cover 103 is painted black so that the LED board 104, the case 102, and the like are hard to see.

CITATION LIST

Patent Literature

Patent Literature 1: Japanese Laid-Open Patent Application "JP-A 2015-156317"

SUMMARY

In the light emitting device 100, the front side of the game machine emits light, but the side surface side of the game machine emits light only at the end surfaces of a front light guide plate. Therefore, there are expectations for the development of a light emitting device that that emits light over a wider are on the side surface side so as to have more impact. If the side surface also emits light over a wider area, it can be seen from a wider angle.

However, as discussed above, a light guide plate can be bent if it has a large radius of curvature, but it cannot be bent at an angle such as 60 degrees or 90 degrees. Accordingly, in order for the side surface to emit light over as wide an area as the front surface, it is necessary for a separate light guide plate to be provided for the side surface. In this case, an LED board will be required for each of the front and side light guide plates, which reduces space efficiency of the unit. In the light emitting device 100 installed in a game machine, when the aesthetic design of the game machine is taken into account, the portion other than the light emitting surface is preferably kept as small as possible. Also the cost will also of course increase.

The present invention was conceived in light of the above problem, and it is an object of the present invention to provide a light emitting device and a game machine which have a plurality of light emitting surfaces with different angles, while still offering excellent space efficiency at a low cost.

In order to solve the above problem, the light emitting device according to one mode of the present disclosure comprises a light source unit and a plurality of light guide plates in which light that is incident from an end and is guided through the interior is reflected by a prism and is emitted from a light emitting surface, wherein the plurality of light guide plates are disposed in a row in a state in which the angles of the light emitting surfaces differ between adjacent light guide plates, and the ends of adjacent light guide plates are butted against each other, the light source unit is disposed at the end of a starting end light guide plate that is at one end of the plurality of light guide plates, on the opposite side from the side where the adjacent light guide plates are butted against each other, and one of the end surfaces of the ends that are butted against each other in the plurality of light guide plates is formed as an inclined surface with a reflection function that changes the angle at which the light is guided and causes the light to be incident on the adjacent light guide plate.

Effects

According to one mode of the present invention, it is possible to realize a light emitting device and a game machine which have a plurality of light emitting surfaces with different angles, while being inexpensive and offering excellent space efficiency.

DESCRIPTION OF EMBODIMENTS

An embodiment according to one aspect of the present disclosure (hereinafter also referred to as "this embodiment") will now be described with reference to the drawings.

§ 1 Application Example

Figure 1:
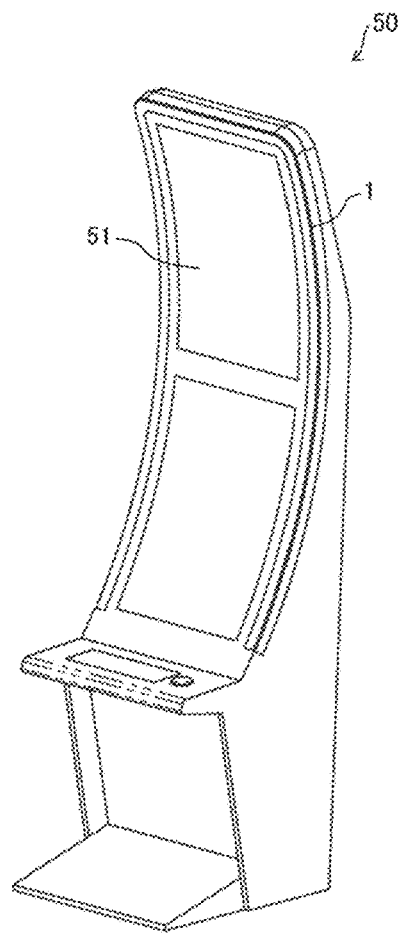
FIG. 1 is an oblique view showing the appearance of a game machine equipped with a decorative lighting device including the light emitting device according to the first embodiment of the present invention.
Figure 2:
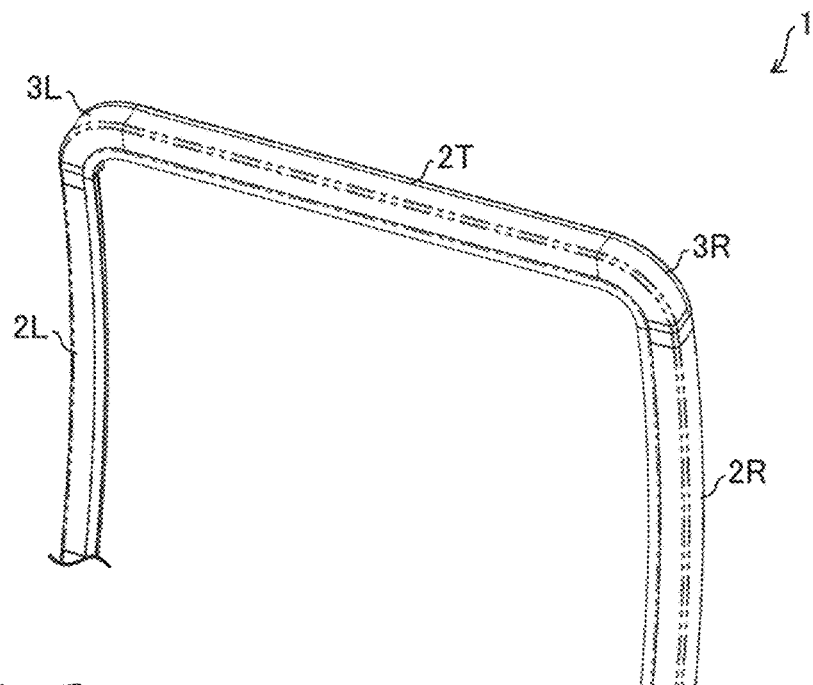
FIG. 2 is an oblique view showing the appearance of the decorative lighting device.

First, a light emitting device that is installed in a game machine 50 will be described as an example of a light emitting device with reference to FIGS. 1 to 4 and 6. As shown in FIG. 1, a decorative lighting device 1 (composed of a light emitting device) is attached to the edge on the front side of a housing 51 of the game machine 50, for example. As shown in FIG. 2, the decorative lighting device 1 is made up of three light emitting devices: a left side portion 2L, a right side portion 2R, and a top portion 2T.

Figure 3:
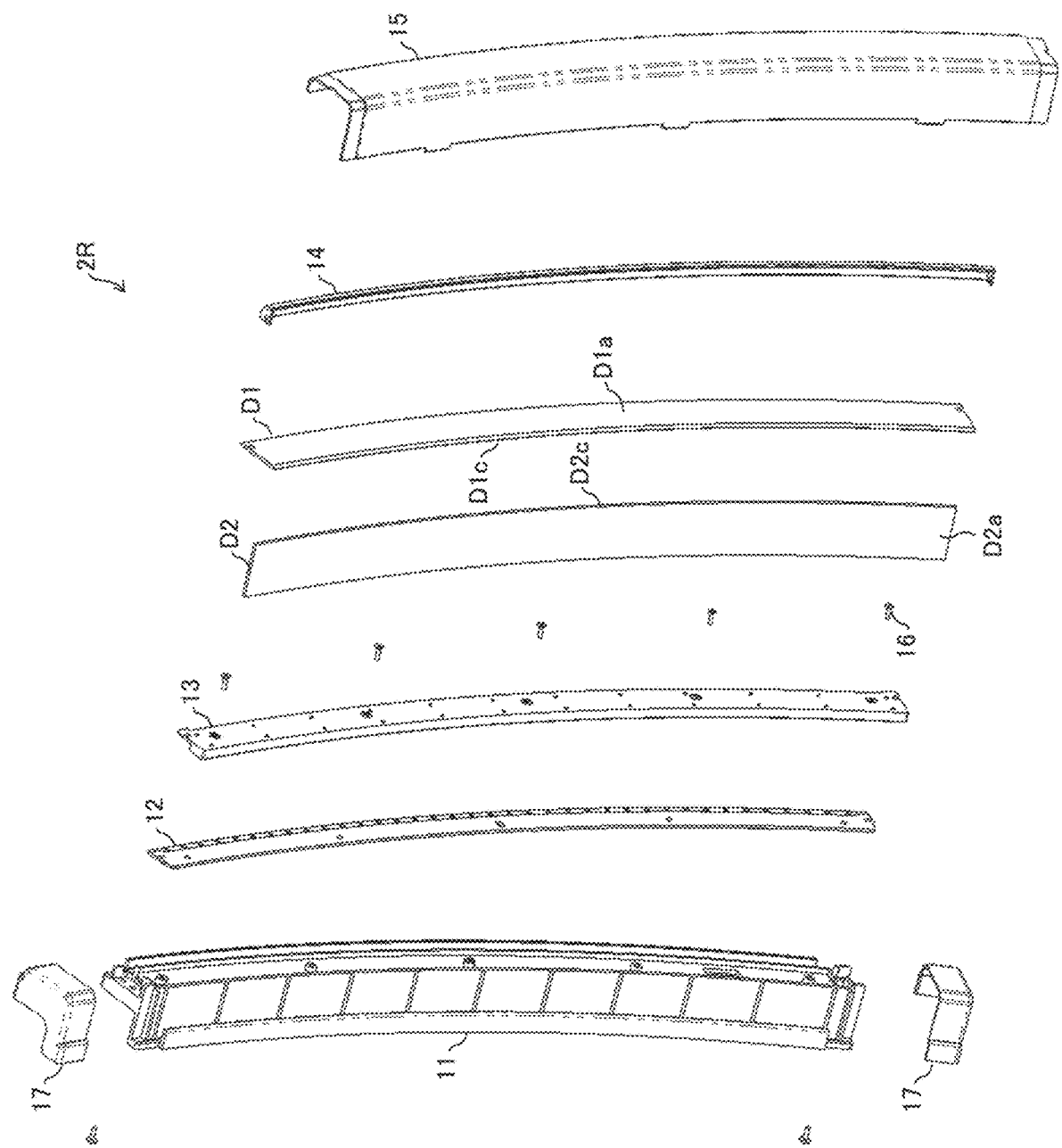
FIG. 3 is an exploded oblique view of the configuration of the right side portion of the light emitting device.
Figure 4:
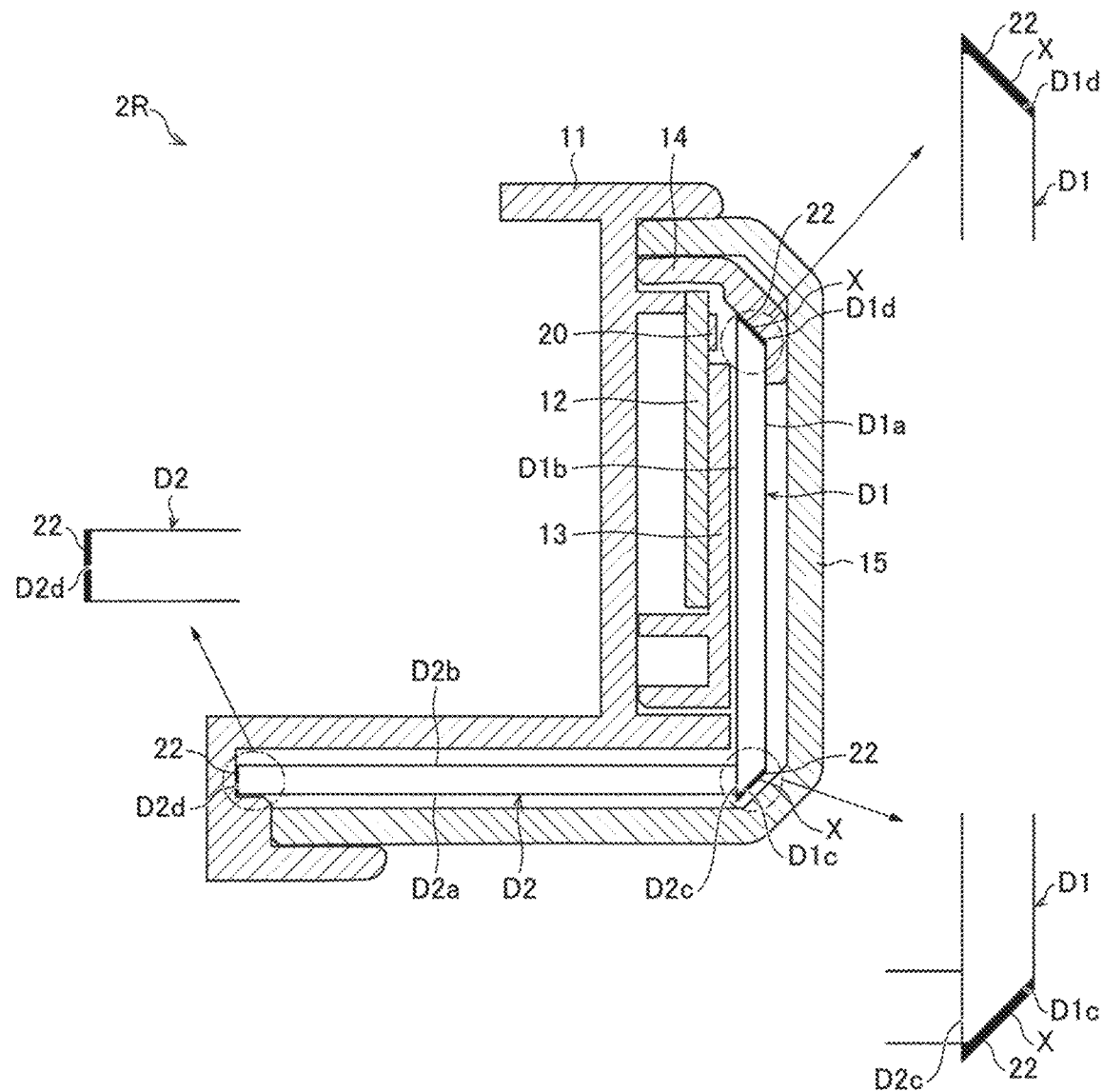
FIG. 4 is a cross-sectional view of the right side portion cut in the lateral direction, and includes a detail view.

As shown in FIGS. 3 and 4, the right side portion 2R (a light emitting device) comprises a side light guide plate D1 and a front light guide plate D2 that are formed in an elongated shape, and an LED board 12 on which a plurality of LEDs 20 are mounted. The LED board 12 is disposed on the rear end side of the side light guide plate D1 and causes light to be incident on the side light guide plate D1 from the rear end side. In the side light guide plate D1 and the front light guide plate D2, D1a and D2a are light emitting surfaces that face the front side in a state of being attached to the game machine 50. A prism (not shown) is formed on the opposite sides D1b and D2b from the light emitting surfaces D1a and D2a so that light that is guided through the inside is emitted from the light emitting surfaces D1a and D2a.

The side light guide plate D1 and the front light guide plate D2 are disposed side by side at an angle of 90 degrees with their ends abutted against each other. The end surface of one of the end portions abutting each other (here, the front end surface D1c of the side light guide plate D1) is formed as an inclined surface X with a reflection function. The inclined surface X with a reflection function has a function of guiding light through the inside of the side light guide plate D1 and causing the light that has reached the front end portion to be incident in the inside of the front light guide plate D2.

Figure 6:
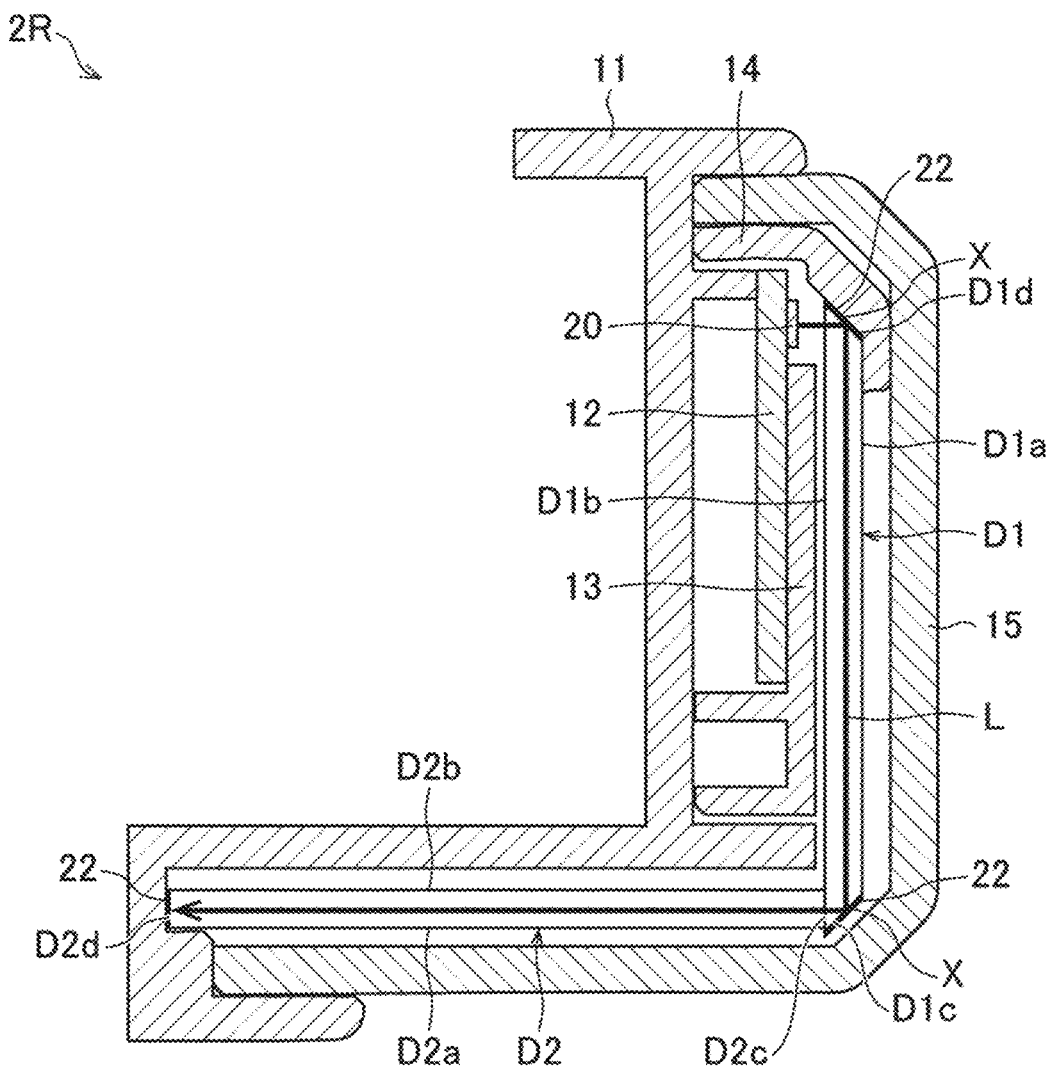
FIG. 6 is a cross-sectional view showing how light is guided in the right side portion.

In the right side portion 2R configured as above, as shown in FIG. 6, the light from the LEDs 20 that is incident in the inside of the side light guide plate D1 from the rear end portion side proceeds to the front end while repeatedly undergoing specular reflection between the light emitting surface D1a and the opposite surface D1b. During this process, the light reflected by the prism formed on the opposite surface D1b is emitted from the light emitting surface D1a. In FIG. 6, the light guide path L is indicated by a thick arrow.

The travel direction of the light that reaches the front end of the side light guide plate D1 is changed by 90 degrees at the inclined surface X with the reflection function of the front end surface D1c of the side light guide plate D1, and is incident on the front light guide plate D2 from the right end surface D2c of the right end of the front light guide plate D2. The light incident on the front light guide plate D2 travels through the inside of the front light guide plate D2, going from the right end to the left end. During this process, the light reflected by the prism formed on the opposite surface D2b is emitted from the light emitting surface D2a.

Thus, in the right side portion 2R, the side light guide plate D1 and the front light guide plate D2 constituting the light emitting surfaces D1a and D2a with different angles can share the LED board 12 to be lit. Consequently, space efficiency as a unit is improved and the cost is lowered as compared with a conventional configuration in which an LED board 12 was required for each of the side light guide plate D1 and the front light guide plate D2 constituting the light emitting surfaces D1a and D2a with different angles. As a result, a light emitting device that has a plurality of light emitting surfaces with different angles, and that therefore has more impact, can be realized at a low cost and with excellent space efficiency.

Such a light emitting device can also be installed in signage or the like.

§ 2 Configuration Example

Embodiment 1

An embodiment of the present disclosure will now be described with reference to FIGS. 1 to 8. A light emitting device installed in the game machine 50 will be described in this embodiment.

1. Appearance of Game Machine

FIG. 1 is an oblique view of the game machine 50, in which is installed the decorative lighting device 1 including the light emitting device according to this embodiment. As shown in FIG. 1, the decorative lighting device 1 is attached to the edge on the front side of the housing 51 of the game machine 50. In the example in FIG. 1, the decorative lighting device 1 has an inverted U shape when viewed from the front, and is attached to three sides: the left and right sides on the front side of the housing 51 and the top side. A recess for fitting the decorative lighting device 1 is provided on the front edge of the housing 51, and the decorative lighting device 1 is attached to this recess. In this Specification, the left-right direction is the left-right direction when looking at the front of the game machine 50.

2. Appearance of Decorative Lighting Device

FIG. 2 is an oblique view of the appearance of the decorative lighting device 1. As shown in FIG. 2, the decorative lighting device 1 comprises three light emitting devices: a left side portion 2L, a right side portion 2R, and a top portion 2T. The upper end of the left side portion 2L and the left end of the top portion 2T are connected at the lower end of the left corner portion 3L, and the upper end of the right side portion 2R and the right end of the top portion 2T are connected at the lower end of the right corner portion 3R. The left side portion 2L and the right side portion 2R have a length of about 120 cm, for example, and have a warp that bends toward the front side going downward. The left side portion 2L and the right side portion 2R have a structure that is in left and right symmetry. The top portion 2T has a length corresponding to the width of the game machine 50, and is formed in an inverted U shape that includes the left corner portion 3L and the right corner portion 3R. The left side portion 2L, the right side portion 2R, and the top portion 2T differ in length, whether or not there is warpage, and orientation, but are all configured as a light emitting device. The right side portion 2R will now be described in detail.

3. Configuration of Right Side Portion 2R

FIG. 3 is an exploded oblique view of the configuration of the right side portion 2R. FIG. 4 is a cross-sectional view of the right side portion 2R, cut in the lateral direction, and includes a detail view. As shown in FIGS. 3 and 4, the right side portion 2R comprises a case 11, an LED board (light source portion) 12, a board cover 13, a side light guide plate (starting end light guide plate, first light guide plate) D1, a front light guide plate (final end light guide plate, second light guide plate) D2, an inner cover 14, and an outer cover 15. All of these members are formed in an elongated shape.

The side light guide plate D1 and the front light guide plate D2 are both plate-shaped members having a thickness of about 2 mm and made of transparent polycarbonate, acrylic resin, or the like. In the side light guide plate D1 and the front light guide plate D2, the light that is incident from the end and is guided through the inside is reflected by a prism (not shown), and is emitted from the light emitting surfaces D1a and D2a. The prism is formed on the opposite surfaces D1b and D2b from the light emitting surfaces D1a and D2a.

As shown in FIGS. 3 and 4, the case 11 has a T-shaped cross section cut in the lateral direction, and has a warp that bends downward toward the front side of the game machine 50. The front light guide plate D2 is attached to the front-facing surface of the case 11. The front light guide plate D2 is attached with the light emitting surface D2a facing the front. Attaching the case 11 having a warp means that the front light guide plate D2 will also have a warp so as to bend downward toward the front side, and the light emitting surface D2a is a curved surface.

The LED board 12, the board cover 13, and the side light guide plate D1 are disposed in that order on the surface of the case 11 facing the right side of the game machine 50. The board cover 13 has a function of hiding the LED board 12 so that it cannot be seen from the outside, and is fixed to the case 11 together with the LED board 12 with a plurality of screws 16.

A plurality of LEDs 20 (light sources) are mounted on the LED board 12 in a row along the lengthwise direction. The LEDs 20 are located at the rear end of the LED board 12, and the LEDs 20 are opposite the rear end of the opposite surface D1b of the side light guide plate D1. The light source is preferably one that has directivity such as the LEDs 20, but the light source is not limited to the LEDs 20.

The side light guide plate D1 is disposed with the light emitting surface D1a facing the right side. As will be described in detail below, the right end portion having the right end surface D2c running in the lengthwise direction of the front light guide plate D2 disposed in the left-right direction, and the front end portion having the front end surface D1c running in the lengthwise direction of the side light guide plate D1 disposed in the front-rear direction are butted together at a 90 degree angle. The side light guide plate D1 and the front light guide plate D2 are disposed side by side with their ends butted together. When the LED board 12 (light source unit) is shared by a plurality of light guide plates, the light is attenuated moving downstream in the direction in which the light travels, but with a configuration in which the light guide plates have an elongated shape and the ends running in the lengthwise direction are butted together, it is possible to suppress this attenuation of light so that a plurality of light emitting surfaces effectively emit light.

The side light guide plate D1 and the front light guide plate D2 correspond to a plurality of light guide plates that are side by side in a state in which the angles of the light emitting surfaces are different between the adjacent light guide plates and the ends of adjacent light guide plates are butted together. In this embodiment, a configuration is described in which there are two light guide plates, namely, the side light guide plate D1 and the front light guide plate D2, but a configuration comprising three or more light guide plates is also possible, which will be described below.

The inner cover 14 is disposed so as to cover the rear end portion of the LED board 12 and the side light guide plate D1. The inner cover 14 has a function of hiding the LEDs 20 mounted on the LED board 12 so that the LEDs 20 are not directly visible from the outside.

The outer cover 15 is a protective cover made of a transparent material, and is positioned so as to cover the light emitting surfaces D1a and D2a of the side light guide plate D1 and the front light guide plate D2 from the outside. In the drawings, the member numbered 17 is an end cover that protects the vertical end portion of the right side portion 2R.

4. Side Light Guide Plate D1, Front Light Guide Plate D2

Figure 5:
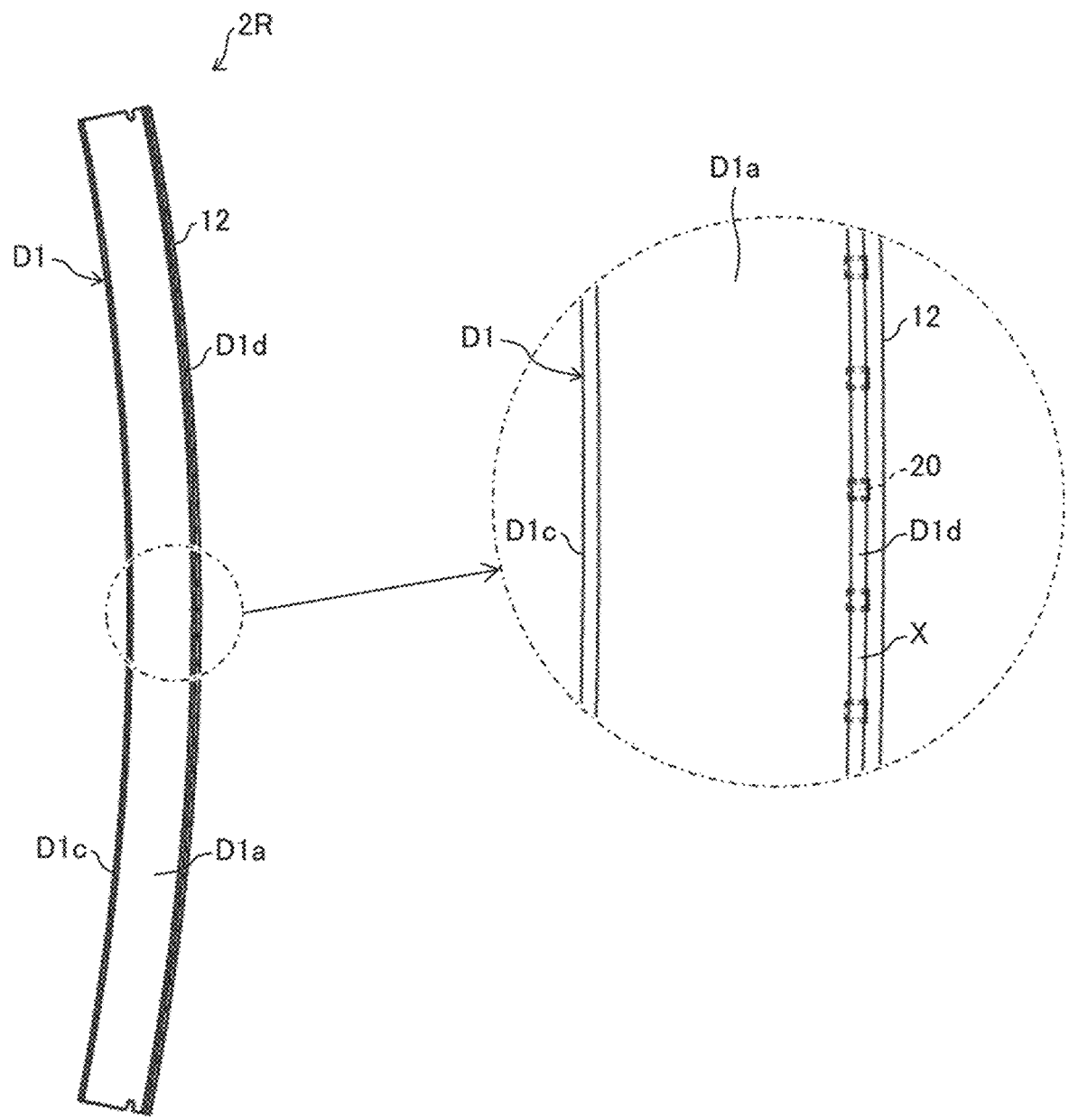
FIG. 5 is a side view of the right side portion, including a detail view, and shows only a side light guide plate and an LED board.

The side light guide plate D1 and the front light guide plate D2 will be described with reference to FIGS. 3 to 5. FIG. 5 is a side view of the right side portion 2R, including a detail view, and shows only the side light guide plate D1 and the LED board 12.

As shown in FIG. 3, the case 11 has a warp, and when attached to this case 11, the front light guide plate D2 that is disposed on the front side also takes on a warp that bends out to the front side going downward, with the light emitting surface D2a becoming a curved surface. Then, as shown in FIG. 4, the side light guide plate D1 that is disposed on the side surface side is disposed in a state in which the front end portion having the front end surface D1c is butted against the right end portion having the right end surface D2c of the front light guide plate D2.

As shown in FIG. 5, the front end portion of the front end surface D1c that is butted against the front light guide plate D2 in the side light guide plate D1 has a shape corresponding to the warp of the front light guide plate D2, which is what makes it possible to butt the two together.

Also, as shown in FIG. 5, the LEDs 20 mounted on the LED board 12 are disposed facing the opposite surface D1b of the side light guide plate D1, on the rear end side of the rear end surface D1d of the side light guide plate D1.

In order to change the angle of the LED light incident from the opposite surface D1b and to guide the light toward the front end portion of the side light guide plate D1, the rear end surface D1d of the side light guide plate D1 is formed as an inclined surface X with a reflection function. This inclined surface X with a reflection function has the function of changing the angle at which the light is guided, and subjects the light to specular reflection.

As shown in FIG. 4, the rear end surface D1d of the side light guide plate D1 is an inclined surface that is inclined at an angle of 45 degrees from the opposite surface D1b toward the light emitting surface D1a. Providing the reflective film 22 to the inclined surface forms the inclined surface X with a reflection function. The reflective film 22 can be formed from a reflective material such as aluminum by vapor deposition or another such manufacturing method. Setting the angle of the inclined surface to 45 degrees allows the travel direction of the light of the LEDs 20 incident from the opposite surface D1b to be changed by 90 degrees. Providing the reflective film 22 makes it possible to effectively suppress the attenuation of light.

As shown in FIG. 4, the inclined surface X with a reflection function is also formed on the front end surface D1c of the front end portion of the side light guide plate D1, which is butted against the right end portion of the front light guide plate D2. The front end surface D1c of the side light guide plate D1 is also an inclined surface that is inclined at an angle of 45 degrees from the opposite surface D1b toward the light emitting surface D1a, and the reflective film 22 is formed on this inclined surface. The inclined surface X with a reflection function formed on the front end surface D1c of the side light guide plate D1 has the function of guiding light through the inside of the side light guide plate D1 and making the light of the LEDs 20 that has reached the front end portion of the side light guide plate D1 be incident inside the front light guide plate D2.

Also, in this embodiment, as a preferred configuration, the reflective film 22 is also formed on the left end surface D2d of the front light guide plate D2. The reflective film 22 formed on the left end surface D2d has the function of turning back the light that has reached the left end surface D2d.

5. Guiding Light in Right Side Portion 2R

Figure 7:
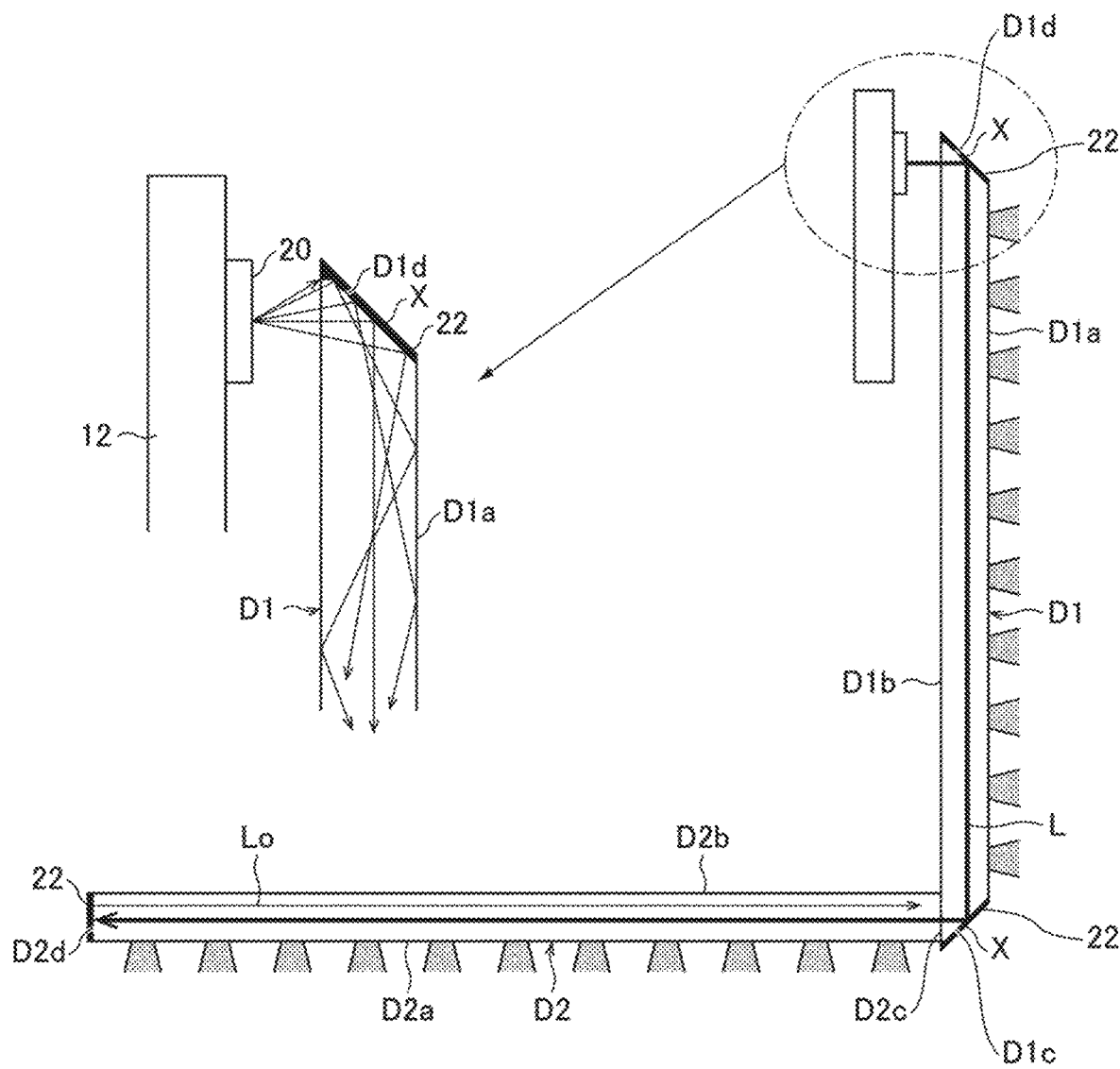
FIG. 7 is a schematic cross-sectional view showing in greater detail how light is guided in the right side portion.

The guiding of light in the right side portion 2R will be described with reference to FIGS. 6 and 7. FIG. 6 is a cross-sectional view showing how light is guided in the right side portion 2R. FIG. 7 is a schematic cross-sectional view showing in greater detail how light is guided in the right side portion 2R. In FIGS. 6 and 7, the light guide path L of the light from the LEDs 20 is indicated by the thick arrow.

As shown in FIG. 6, the light emitted from the LEDs 20 is incident from the opposite surface D1b of the side light guide plate D1, the travel direction of the light is changed by 90 degrees at the inclined surface X with the reflection function of the rear end surface D1d, and the light is guided from the rear end portion to the front end portion through the inside of the side light guide plate D1. The travel direction of the light that has reached the front end portion of the side light guide plate D1 is changed by 90 degrees at the inclined surface X with the reflection function of the front end surface D1c of the side light guide plate D1, and is incident on the front light guide plate D2 from the right end surface D2c of the right end portion of the front light guide plate D2. The light incident on the front light guide plate D2 is guided through the inside of the front light guide plate D2, from the right end portion to the left end portion. The light that has reached the left end portion of the front light guide plate D2 is turned back by the reflective film 22 formed on the left end surface D2d.

As shown in FIG. 7, the light of the LEDs 20 is undergoes specular reflection at the inclined surface X with a reflection function on the opposite surface D1b of the side light guide plate D1. The light that has undergone specular reflection at the inclined surface X with a reflection function proceeds through the inside of the side light guide plate D1 to the front end portion while repeatedly undergoing specular reflection between the light emitting surface D1a and the opposite surface D1b. During this process, the light incident on the prism (not shown) formed on the opposite surface D1b is reflected by the prism, and is emitted from the light emitting surface D1a, where it can be seen. The same applies to the inside of the front light guide plate D2, and the light made incident on the inside of the front light guide plate D2 at the inclined surface X with the reflection function of the front end surface D1c of the side light guide plate D1 proceeds to the left end portion while repeatedly undergoing specular reflection between the light emitting surface D2a and the opposite surface D2b. During this process, the light incident on the prism formed on the opposite surface D2b is reflected by the prism, and is emitted from the light emitting surface D2a, where it can be seen. The thin arrow indicated by $L_O$ in FIG. 7 is light that has been turned back by the reflective film 22 of the left end surface D2d of the front light guide plate D2. Turning back the light that has reached the end point allows the light of the LEDs 20 to be used more effectively, which affords brighter illumination.

Figure 8:
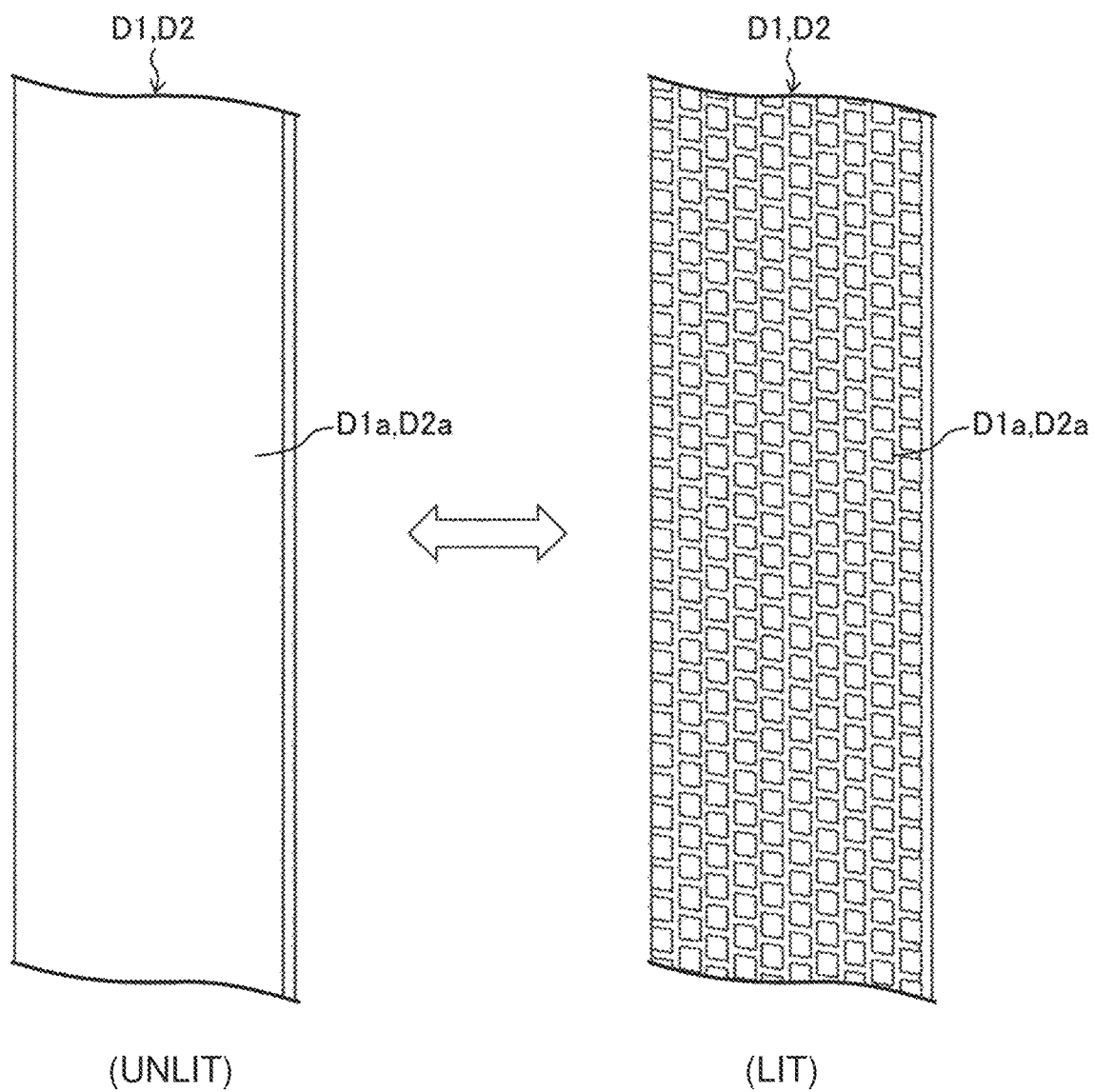
FIG. 8 is a diagram showing the lit state and the unlit state of the side light guide plate and the front light guide plate in the right side portion.

FIG. 8 is a diagram showing the lit and unlit states of the side light guide plate D1 and the front light guide plate D2. When the LEDs 20 are lit, the design or graphics drawn by the prism emerge.

6. Effect

With the above configuration, the side light guide plate D1 and the front light guide plate D2 are disposed side by side at an angle of 90 degrees with the ends butted together, and the end surface of one of the end portions butted together (here, the front end surface D1c) is formed as an inclined surface X with a reflection function. Consequently, the light guided by the side light guide plate D1 is made incident on the front light guide plate D2 at the inclined surface X with the reflection function.

As a result, the side light guide plate D1 and the front light guide plate D2 constituting the light emitting surfaces D1a and D2a with different angles share the LED board 12 for illumination. Compared to a conventional configuration in which an LED board 12 was required for each of the side light guide plate D1 and the front light guide plate D2 constituting the light emitting surfaces D1a and D2a with different angles, the space efficiency as a unit is improved. Also, since the number of LED boards 12 can be reduced, the cost can also be lower.

Also, with the above configuration, when the end surface of either the side light guide plate D1 or the front light guide plate D2 is used as the inclined surface X with the reflection function, the side light guide plate D1 side having the inclined surface X with the reflection function is also selected for the rear end surface D1d. Therefore, the front light guide plate D2 does not need an inclined end surface, and may be an end surface forming a right angle to the light emitting surface D2a, as in a conventional case. Thus manufacturing the light guide plate provided with the inclined surface X with the reflection function separately from the light guide plate not provided with the inclined surface X having the reflection function reduces manufacturing costs.

Embodiment 2

Another embodiment of the present invention will now be described with reference to FIGS. 9 to 11. For the sake of description, those members having the same functions as in the first embodiment are numbered the same, and will not be described again.

A light emitting device installed in the game machine 50 will again be described in this embodiment. In the right side portion 2R having the configuration of the light emitting device of Embodiment 1, the LED board 12 is disposed on the opposite surface D1*b* on the rear end portion side of the side light guide plate D1. Accordingly, an inclined surface X with a reflection function has to be provided to the rear end surface D1*d* of the side light guide plate D1. With this configuration, the inclined surface X with a reflection function is necessary for the rear end surface D1*d* of the side light guide plate D1, but it is much less likely that the LEDs 20 will be visible directly from the outside.

Figure 9:
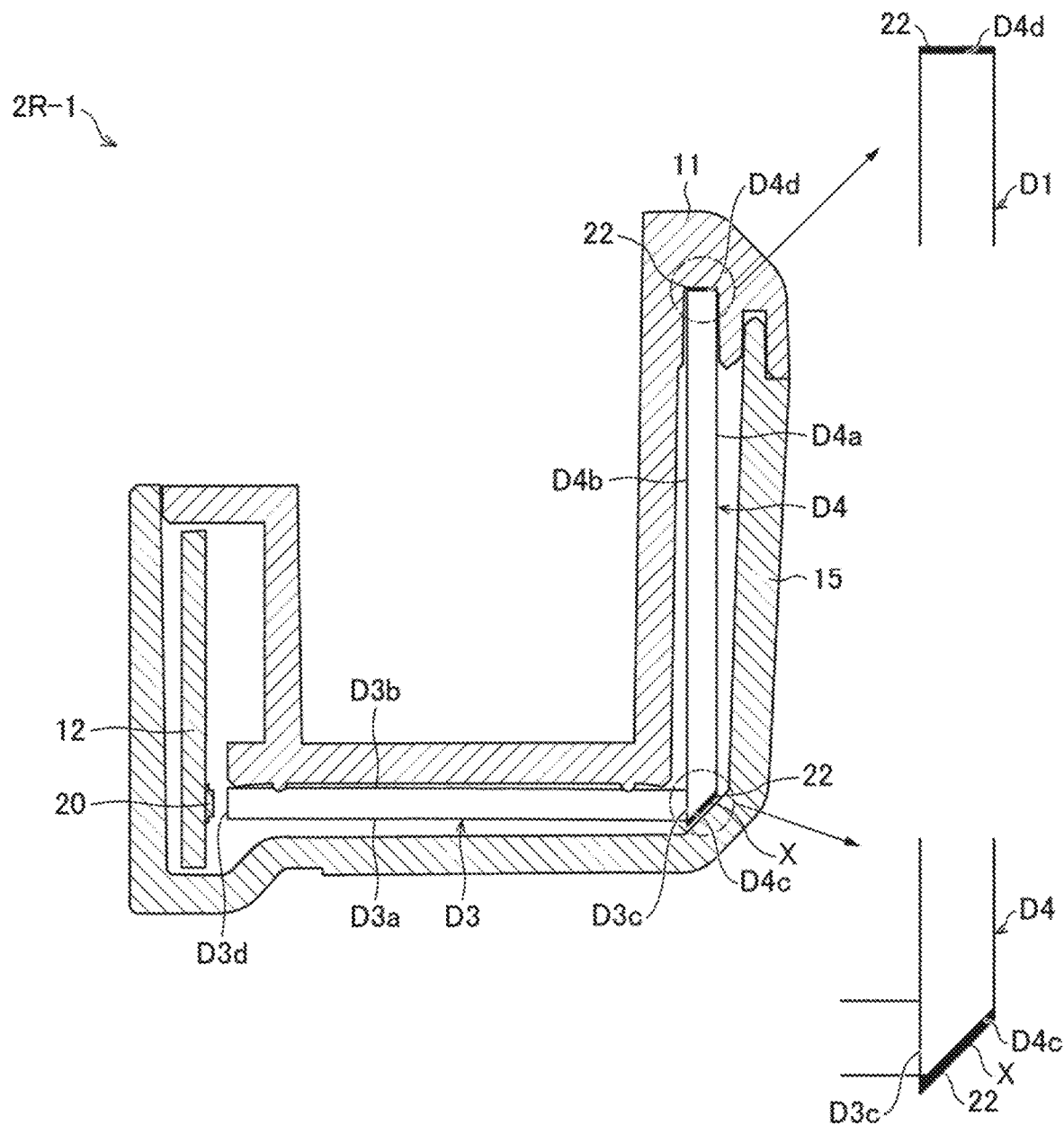
FIG. 9 is a cross-sectional view of the right side portion of the light emitting device according to a second embodiment of the present invention, cut in the lateral direction, and includes a detail view.

On the other hand, with a right side portion 2R-1 having the configuration of the light emitting device of this embodiment, as shown in FIG. 9, the LED board 12 is disposed on the left side of the front light guide plate D3 (starting end light guide plate, first light guide plate), so that light is incident from the left end surface D3*d* of the front light guide plate D3. FIG. 9 is a cross-sectional view of the right side portion 2R-1 having the configuration of the light emitting device of this embodiment, cut in the lateral direction, and includes a detail view. The appearance of the right side portion 2R-1 is approximately the same as that of the right side portion 2R.

With this configuration, the inclined surface X with a reflection function is only at one place, where the ends of the front light guide plate D3 and the side light guide plate (final end light guide plate, second light guide plate) D4 are butted together, so there is a reduction in the loss of light due to reflection on the inclined surface X with the reflection function. Also, since the LED board 12 is located on the attachment side when the decorative lighting device 1 (see FIG. 1) is attached to the game machine 50, there is no need for the board cover 13 or the inner cover 14, and the number of parts can be reduced.

The light guidance in the right side portion 2R-1 will be described with reference to FIGS. 10 and 11. FIG. 10 is a cross-sectional view showing how light is guided in the right side portion 2R-1. FIG. 11 is a schematic cross-sectional view showing in greater detail how light is guided in the right side portion 2R-1. In FIGS. 10 and 11, the light guide path L of the light from the LEDs 20 is indicated by a thick arrow.

Figure 10:
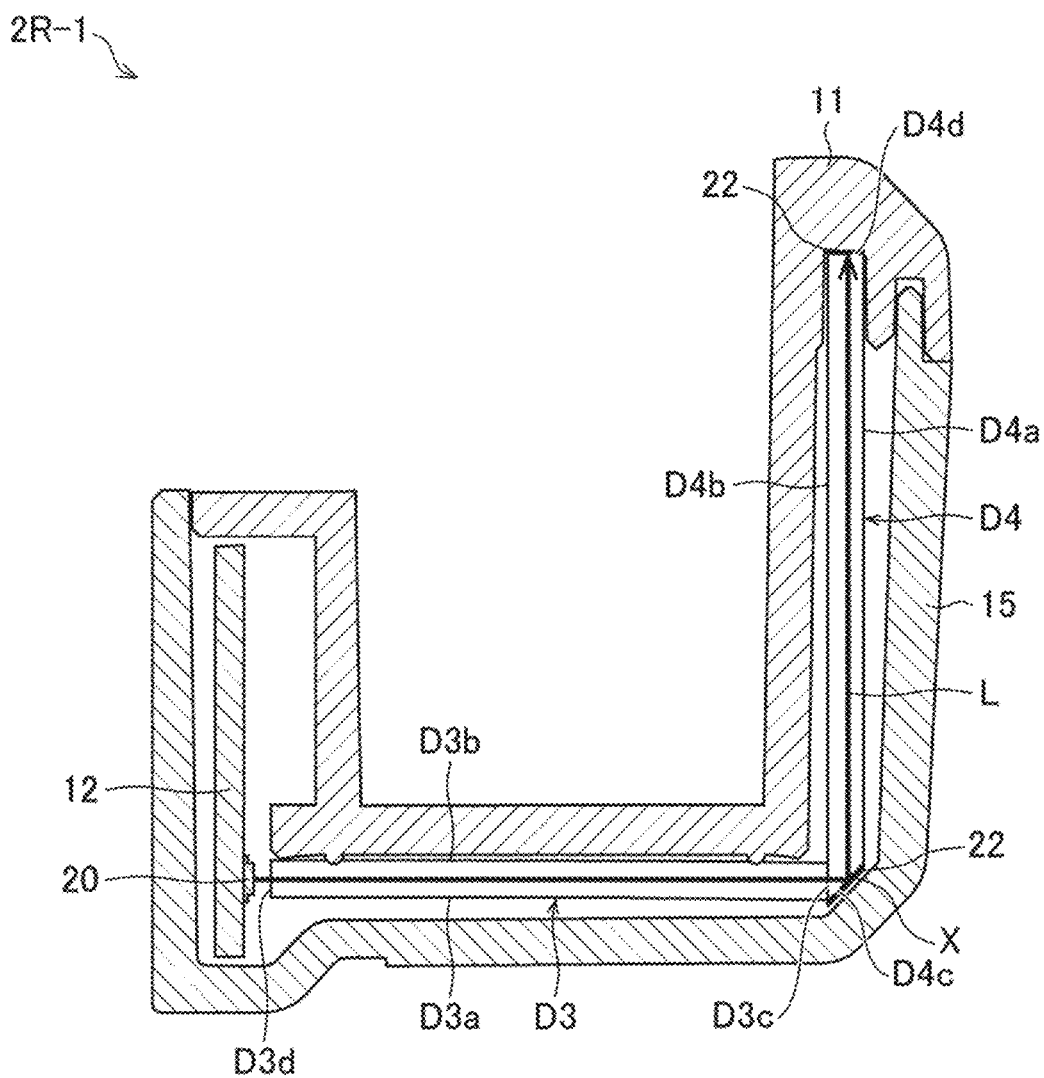
FIG. 10 is a cross-sectional view showing how light is guided in the right side portion shown in FIG. 9.

As shown in FIG. 10, the light emitted from the LEDs 20 is incident on the left end surface D3*d* of the front light guide plate D3, and is guided through the inside of the side light guide plate D1, from the left end portion to the right end portion. The travel direction of the light that has reached the right end portion of the front light guide plate D3 is changed by 90 degrees at the inclined surface X with the reflection function of the front end surface D4*c* of the side light guide plate D4, and the light is guided through the inside of the side light guide plate D4, from the front end portion to the rear end portion. The light that has reached the rear end portion of the light guide plate D4 is turned back by the reflective film 22 formed on the rear end surface D4*d*.

Figure 11:
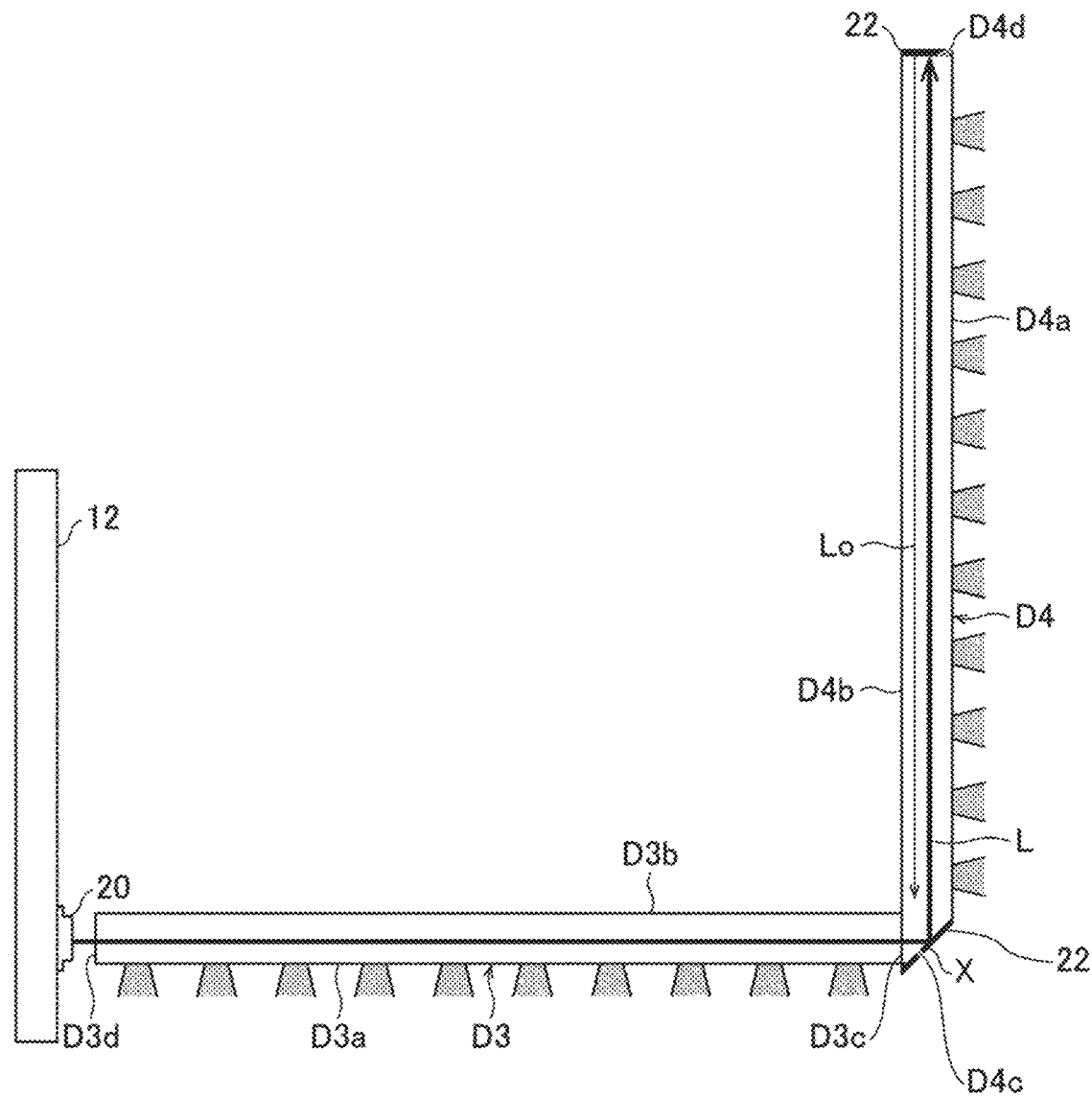
FIG. 11 is a schematic cross-sectional view showing in greater detail how light is guided in the right side portion shown in FIG. 9.

As shown in FIG. 11, the light incident from the left end surface D3*d* of the front light guide plate D3 proceeds through the inside of the front light guide plate D3 to the right end portion while repeatedly undergoing specular reflection between the light emitting surface D3*a* and the opposite surface D3*b*. During this process, the light incident on the prism formed on the opposite surface D3*b* is reflected by the prism, is emitted from the light emitting surface D3*a*, and can be seen. The same applies to the inside of the side light guide plate D4, and the light made incident on the inside of the side light guide plate D4 at the inclined surface X with the reflection function of the front end surface D4*c* of the side light guide plate D4 proceeds to the rear end portion while repeatedly undergoing specular reflection between the light emitting surface D4*a* and the opposite surface D4*b*. During this process, the light incident on the prism formed on the opposite surface D4*b* is reflected by the prism, is emitted from the light emitting surface D4*a*, and can be seen.

Embodiment 3

Another embodiment of the present invention will now be described with reference to FIG. 12. For the sake of description, those members having the same functions as in Embodiments 1 and 2 are numbered the same, and will not be described again.

Again in this embodiment, a light emitting device installed in the game machine 50 will be described as an example of a light emitting device. With the right side portion 2R-1 having the configuration of the light emitting device of Embodiment 2, the front light guide plate D3 and the side light guide plate D4 were provided, and the end surface of one of the portions where the ends are butted together is formed as an inclined surface X with a reflection function.

Figure 12:
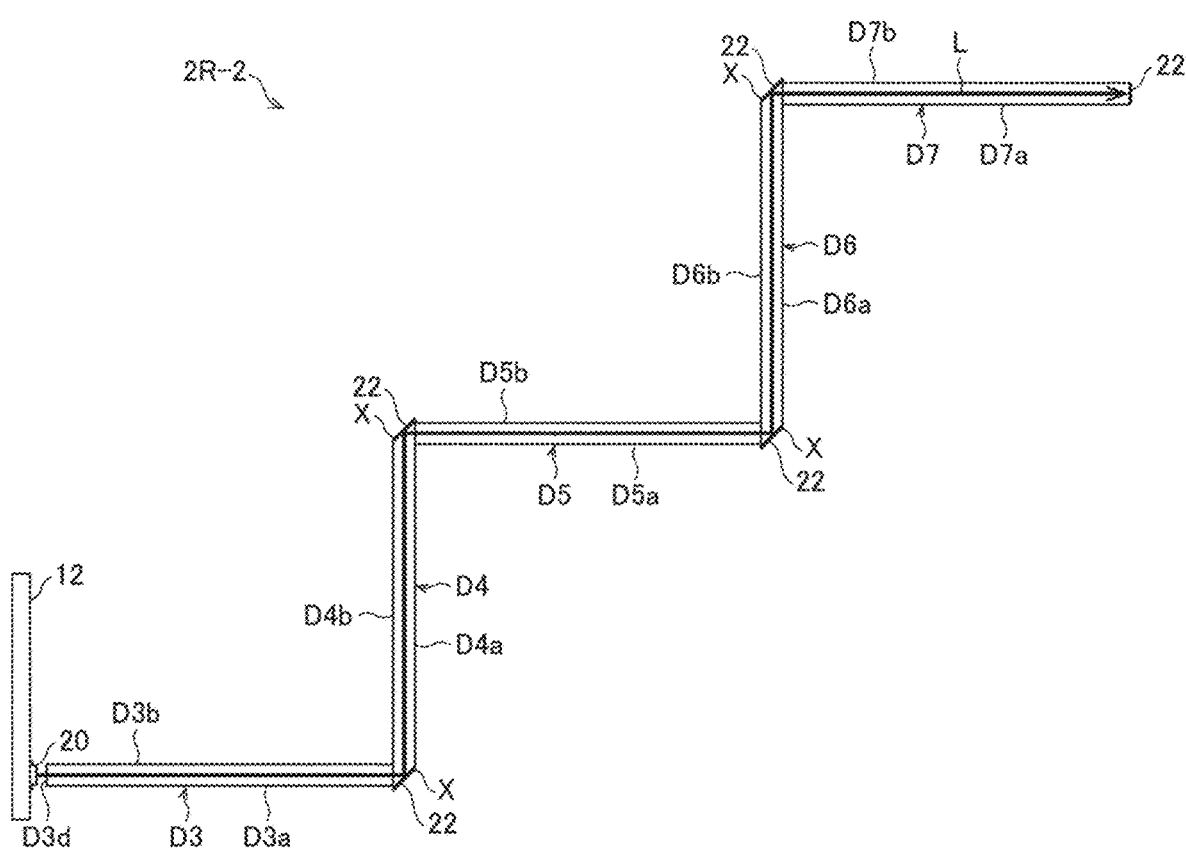
FIG. 12 is a cross-sectional view showing how light is guided in the right side portion of the light emitting device according to a third embodiment of the present invention, including a detail view, and shows only a plurality of continuous light guide plates and an LED board.

By contrast, as shown in FIG. 12, the right side portion 2R-2 having the configuration of the light emitting device of this embodiment is configured to comprise a front light guide plate D5, a side light guide plate D6, and a front light guide plate D7 behind the side light guide plate D4. FIG. 12 is a cross-sectional view showing how light is guided in the right side portion 2R-2, includes a detail view, and shows only a plurality of light guide plates D3 to D7 and an LED board 12 which are connected to together.

The ends of the light guide plates D3 to D7 are butted against each other so as to form an angle of 90 degrees between adjacent light guide plates. The end surface of one of the end portions where the side light guide plate D4 and the front light guide plate D5 are butted together is formed as the inclined surface X with a reflection function. In the example in FIG. 12, the end surface of the side light guide plate D4 is formed as the inclined surface X with a reflection function. Similarly, the end surface of one of the end portions where the front light guide plate D5 and the side light guide plate D6 are butted together is formed as the inclined surface X with a reflection function. Similarly, the end surface of one of the end portions where the side light guide plate D6 and the front light guide plate D7 are butted together is formed as the inclined surface X with a reflection function. In the example in FIG. 12, the front and rear end surfaces of the side light guide plate D6 are both formed as the inclined surface X with a reflection function. Also, as a preferred configuration, a reflective film 22 is provided to the right end surface of the front light guide plate D7 (final end light guide plate) located at the final end of the plurality of light guide plates D3 to D7.

With this configuration, as five light emitting surfaces (D3*a* to D7*a*) can share the LED board 12 for illumination, which affords decorative lighting with even more impact. Although a configuration comprising five light guide plates was given as an example here, the number of light guide plates is not limited to this.

Embodiment 4

Figure 13:
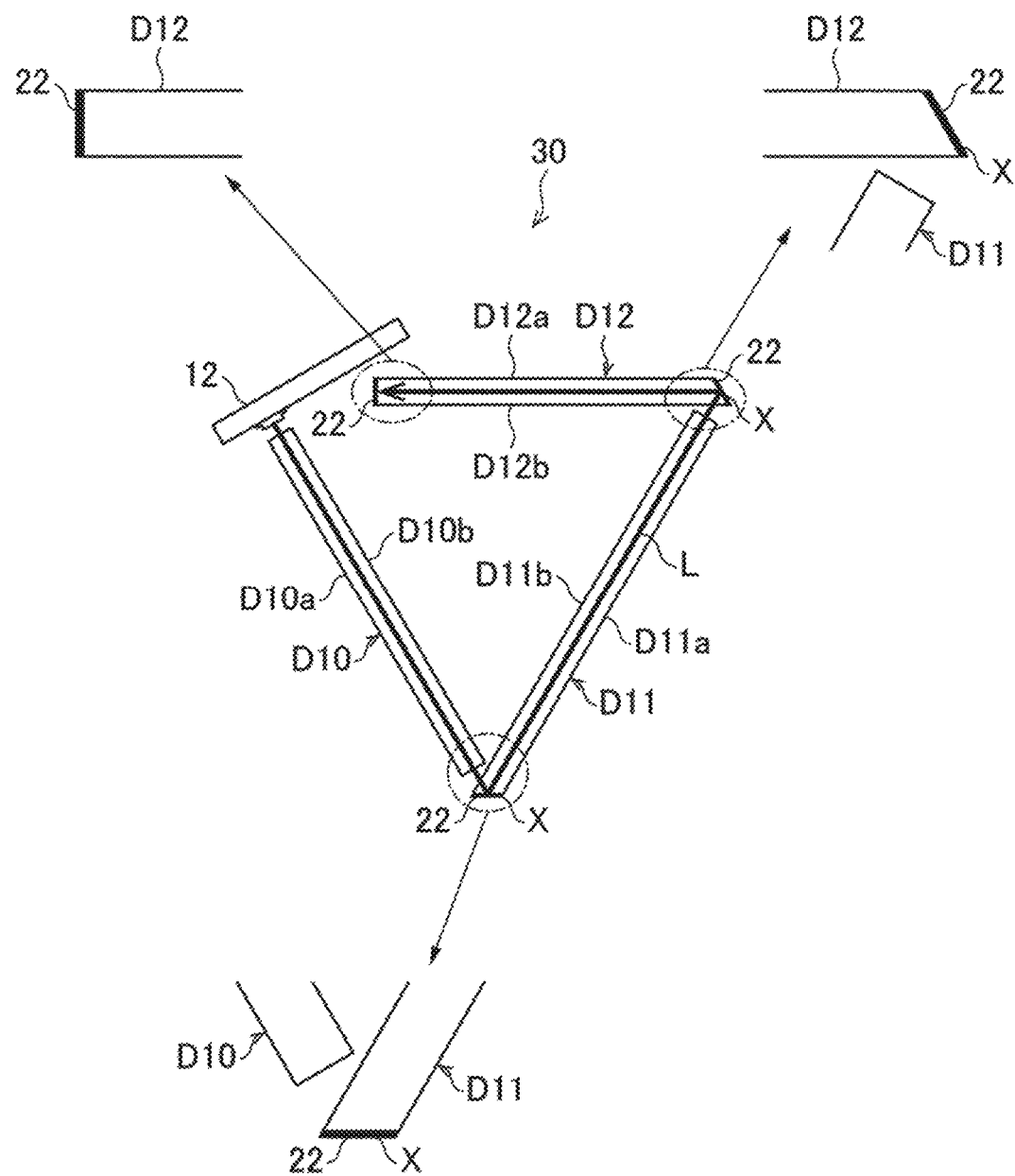
FIG. 13 is a cross-sectional view of the light emitting device according to a fourth embodiment of the present invention, cut in the horizontal direction, and includes a detail view.
Figure 14:
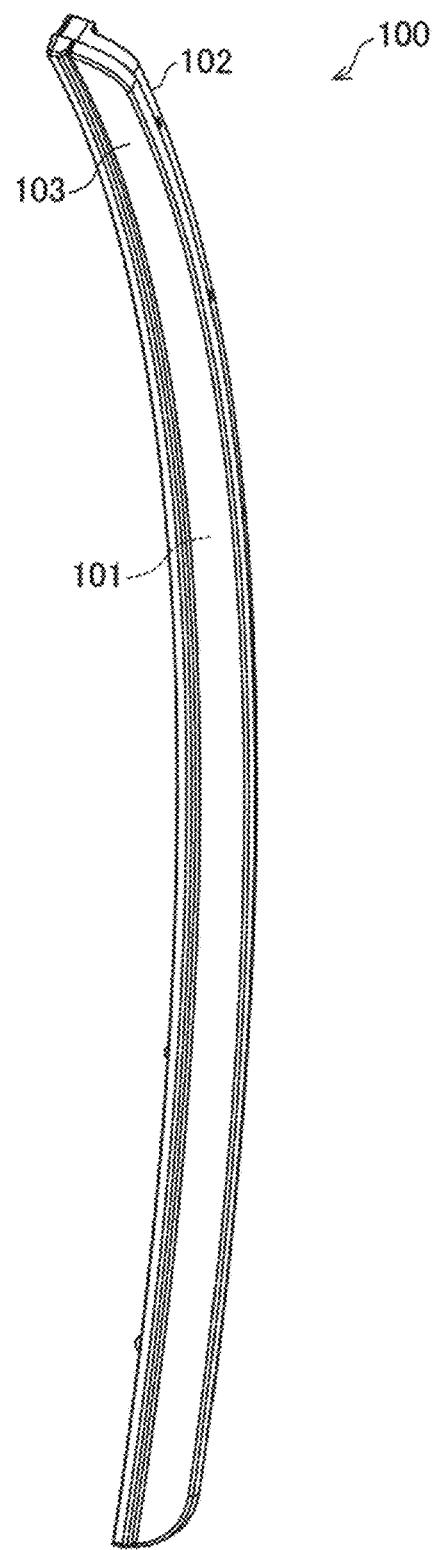
FIG. 14 is an external view of a conventional light emitting device equipped with an elongated light guide plate installed on the right side of a game machine.
Figure 15:
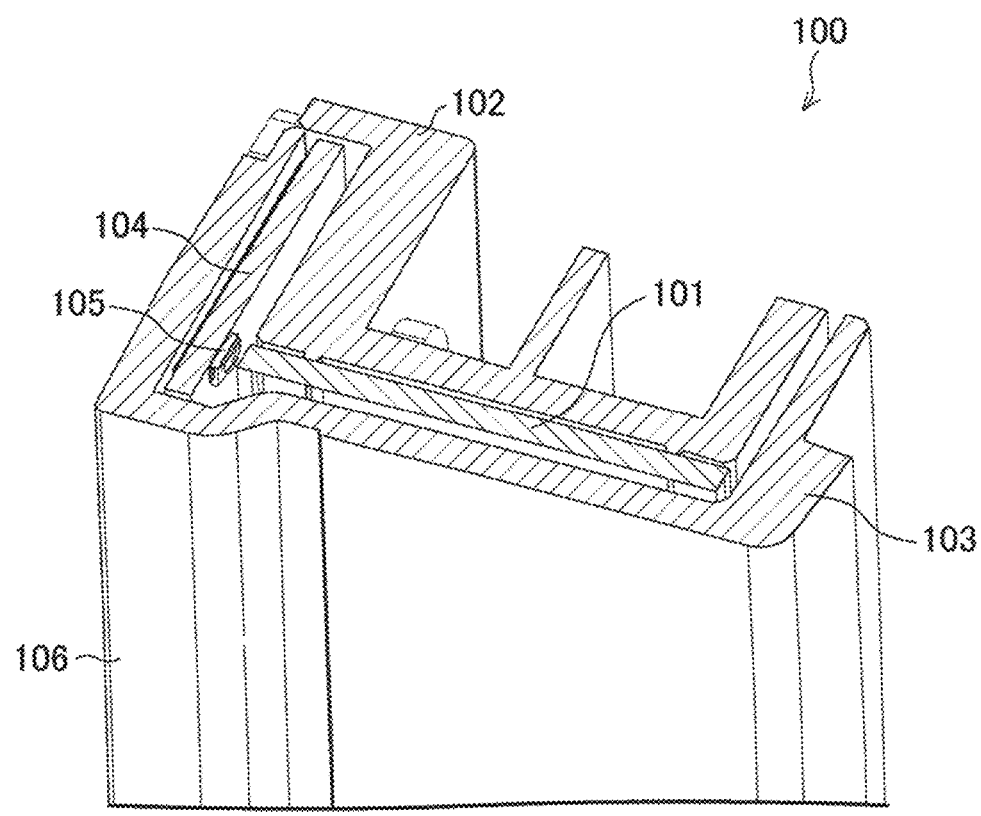
FIG. 15 is a cross-sectional view of the conventional light emitting device shown in FIG. 14, cut in the lateral direction.

Another embodiment of the present invention will now be described with reference to FIG. 13. For the sake of description, those members having the same functions as in Embodiments 1 to 3 are numbered the same, and will not be described again.

In this embodiment, a light emitting device 30 that can be used as an illumination device, such as a lantern, will be described as an example of a light emitting device. FIG. 13 is a cross-sectional view of the light emitting device 30 according to this embodiment, cut in the horizontal direction, and includes a detail view. As shown in FIG. 13, the light emitting device 30 comprises a light guide plate D10, a light guide plate D11, and a light guide plate D12. No external view is not shown, but since this is a lighting fixture such as a lantern, the three light guide plates D10 to D12 do not have to have an elongated shape.

The ends of the three light guide plates D10 to D12 are butted together so as to form an angle of 60 degrees between adjacent light guide plates. The three light guide plates D10 to D12 are disposed with the opposite surfaces D10b to D12b, on which prisms (not shown) are formed, facing inward and the light emitting surfaces D10a to D12a facing outward. The end surface of one of the end portions where the light guide plate D10 and the light guide plate D11 are butted together is formed as the inclined surface X with a reflection function. In the example in FIG. 13, the end surface of the light guide plate D11 is formed as the inclined surface X with a reflection function. Similarly, the end surface of one of the end portions where the light guide plate D11 and the light guide plate D12 are butted together is formed as the inclined surface X with a reflection function. In the example in FIG. 13, the end surface of the light guide plate D12 is formed as the inclined surface X with a reflection function.

Here, the inclination angle of the inclined surface X with the reflection function is set so that the that is emitted from the end surfaces of the light guide plates D10 and D12 and is incident on the opposite surfaces D11b and D12b of the light guide plates D11 and D12 will be guided to the end portion on the opposite side from the incident side of the light guide plates D11 and D12.

The LED board 12 serving as a light source portion is disposed at the end portion on the opposite side from the side of the light guide plate (starting end light guide plate) D10 that is butted together with the light guide plate D11. Also, as a preferred configuration, the reflective film 22 is provided on the end surface of the light guide plate D12 (final end light guide plate) located at the final end of the three continuous light guide plates D10 to D12, on the opposite side from the side butted together with the light guide plate D11.

With this configuration, it is possible to realize a lantern or other such lighting fixture that is inexpensive and offers excellent space efficiency. A configuration comprising three light guide plates was given as an example here, but the number of light guide plates is not limited to this.

Summary

The light emitting device according to one mode of the present disclosure comprises a light source unit and a plurality of light guide plates in which light that is incident from the end portion and is guided through the inside is reflected by a prism and is emitted from a light emitting surface, wherein the light guide plates are disposed in a row in a state in which the angles of the light emitting surfaces differ between adjacent light guide plates, and the ends of adjacent light guide plates are butted against each other, the light source unit is disposed at the end of a starting end light guide plate that is at one end of the plurality of light guide plates, on the opposite side from the side where the adjacent light guide plates are butted against each other, and the end surface of one of the ends that are butted against each other in the plurality of light guide plates is formed as an inclined surface with a reflection function that changes the angle at which the light is guided and causes the light to be incident on the adjacent light guide plate.

With this configuration, a plurality of light guide plates are disposed in a row in a state in which their ends are butted together in a state in which the angles of the light emitting surfaces are different. The end surface of one of the end portions of the plurality of light guide plates that are butted together is formed as an inclined surface with a reflection function. The inclined surface with a reflection function has the function of changing the angle at which the light is guided, so that the light will be incident on the adjacent light guide plate, and the light can be passed on to the adjacent light guide plate.

Consequently, a plurality of light guide plates that are disposed in a row and constitute light emitting surfaces with different angles share a common light source unit for illumination. Compared to a conventional configuration in which a light source unit was required for each of the light guide plates constituting the light emitting surfaces with different angles, the space efficiency as a unit is improved. Also, since the light source unit is shared, the number of light source units can be reduced, and the cost can also be lower.

In the light emitting device according to one mode of the present disclosure, the configuration may be such that the inclined surface with a reflection function is formed by providing a reflective film on an inclined surface. This makes it easy to configure an inclined surface with a reflection function in which the angle at which the light is guided is changed so that the light will be incident on the adjacent light guide plate.

In the light emitting device according to one mode of the present disclosure, the configuration is such that the plurality of light guide plates have an elongated shape and the ends along the lengthwise direction are butted against each other. When a light source unit is shared among a plurality of light guide plates, the light is attenuated toward the downstream side in the direction in which the light travels. However, with a configuration such as this, it is possible to suppress the attenuation of light and effectively illuminate a plurality of light emitting surfaces.

In the light emitting device according to one mode of the present disclosure, the configuration can be such that a reflective film is provided to the end surface of the end portion on the opposite side from the side abutting with the adjacent light guide plate, in the final end light guide plate at the end on the opposite side from the starting end light guide plate (among the plurality of light guide plates). Consequently, light that has reached the final end light guide plate can be turned back, and the light can be used more effectively.

In the light emitting device according to one mode of the present disclosure, the configuration can also be such that the plurality of light guide plates comprise a first light guide plate (as the starting end light guide plate) and a second light guide plate that is adjacent to the first light guide plate, wherein either the first light guide plate or the second light guide plate is disposed in a warped state in which the light emitting surface is curved, and the other of the first light guide plate and the second light guide plate has a shape corresponding to this warp at the end on the side that abuts with the light guide plate that is warped, and the first light guide plate and the second light guide plate are butted together at an angle of 90 degrees.

With the above configuration, in a light emitting device in which the light emitting surface has a warp toward the front, which was previously proposed by the applicant of the present application, the side surface side can be illuminated in addition to the front surface, which affords a light emitting device that has more impact.

The game machine according to one mode of the present disclosure comprises the light emitting device according to one mode of the present disclosure. The light emitting device according to one mode of the present disclosure has a plurality of light emitting surfaces having different angles and also affords excellent space efficiency at low cost, so it is possible to realize a game machine having decorative lighting that has greater impact.

The present invention is not limited to or by the above embodiments, and various modifications are possible within the scope of the claims. Embodiments obtained by appropriately combining the technical means disclosed in different embodiments are also encompassed by the technical scope of the present invention.

REFERENCE SIGNS LIST 1 decorative lighting device
2R right side portion (light emitting device)
11 cases
12 LED board
13 board cover
14 inner cover
15 outer cover
20 LED
22 reflective film
30 light emitting device
50 game machine
51 housing
D1 side light guide plate (light guide plate, first light guide plate, starting end light guide plate)
D2 front light guide plate (light guide plate, second light guide plate, final end light guide plate)
D3 front light guide plate (light guide plate, first light guide plate, starting end light guide plate)
D4 side light guide plate (light guide plate, second light guide plate, final end light guide plate)
D5 front light guide plate (light guide plate)
D6 side light guide plate (light guide plate)
D7 front light guide plate (light guide plate, final end light guide plate)
D10 light guide plate (starting end light guide plate)
D11 light guide plate
D12 light guide plate (final end light guide plate)
D1a to D7a, D10a to D12a light emitting surfaces
D1b to D7b, D10b to D12b opposite surfaces
X inclined surface with reflection function

The invention claimed is:

1. A light emitting device, comprising:
a light source unit; and
a plurality of light guide plates in which light, that is incident from an end and is guided through an interior, is reflected by a prism and is emitted from a light emitting surface,
wherein the plurality of light guide plates are disposed in a row in a state in which angles of the light emitting surfaces differ between adjacent light guide plates, and ends of adjacent light guide plates are butted against each other,
the light source unit is disposed at an end of a starting end light guide plate that is at one end of the plurality of light guide plates, on an opposite side from a side where the adjacent light guide plates are butted against each other, and
an end surface of one of ends that are butted against each other in the plurality of light guide plates is formed on an inclined surface with a reflection function configured to change an angle at which the light is guided and cause the light to be incident on the adjacent light guide plate.

2. The light emitting device according to claim 1, wherein the inclined surface with a reflection function is formed by providing a reflective film to an inclined surface.

3. The light emitting device according to claim 1, wherein the plurality of light guide plates have an elongated shape and the ends along a lengthwise direction are butted against each other.

4. The light emitting device according to claim 1, wherein a reflective film is provided on an end surface of an end on an opposite side from a side where adjacent light guide plates are butted against each other, in a final end light guide plate at an end on an opposite side from the starting end light guide plate, out of the plurality of light guide plates.

5. The light emitting device according to claim 1, comprising, as the plurality of light guide plates, a first light guide plate serving as the starting end light guide plate and a second light guide plate that is adjacent to the first light guide plate,
wherein the light emitting surface of either the first light guide plate or the second light guide plate is disposed in a state of being warped into a curved surface,
the other of the first light guide plate and the second light guide plate has a shape corresponding to the warp at an end on a side that abuts with either the first light guide plate or the second light guide plate that is warped, and
the first light guide plate and the second light guide plate are butted together at an angle of 90 degrees.

6. A game machine comprising the light emitting device according to claim 1.

* * * * *